(12) United States Patent
Shin

(10) Patent No.: US 11,499,347 B2
(45) Date of Patent: Nov. 15, 2022

(54) G-SENSOR FOR AUTOMOBILE TRAY

(71) Applicant: NIFCO KOREA, INC., Chungcheongnam-do (KR)

(72) Inventor: Yoon Hwan Shin, Chungcheongnam-do (KR)

(73) Assignee: NIFCO Korea, Inc.

( * ) Notice: Subject to any disclaimer, the term of this patent is extended or adjusted under 35 U.S.C. 154(b) by 531 days.

(21) Appl. No.: 16/607,415

(22) PCT Filed: Apr. 25, 2018

(86) PCT No.: PCT/KR2018/004771
§ 371 (c)(1),
(2) Date: Oct. 23, 2019

(87) PCT Pub. No.: WO2018/199608
PCT Pub. Date: Nov. 1, 2018

(65) Prior Publication Data
US 2020/0123814 A1 Apr. 23, 2020

(30) Foreign Application Priority Data
Apr. 28, 2017 (KR) .......... 10-2017-0055569

(51) Int. Cl.
E05B 77/06 (2014.01)
E05B 83/28 (2014.01)

(52) U.S. Cl.
CPC .......... E05B 77/06 (2013.01); E05B 83/28 (2013.01); E05Y 2201/22 (2013.01);
(Continued)

(58) Field of Classification Search
CPC ..... E05B 77/06; E05B 83/28; E05Y 2201/22; E05Y 2201/238; E05Y 2800/252; E05Y 2800/422; E05Y 2900/538; B60R 7/04
(Continued)

(56) References Cited

U.S. PATENT DOCUMENTS 7,571,948 B2 * 8/2009 Suh .......... E05B 77/06
292/DIG. 22
8,109,424 B2 * 2/2012 Lee .......... B60R 7/06
224/281

(Continued)

FOREIGN PATENT DOCUMENTS

DE 102016116790 A1 3/2017
EP 2565075 A2 3/2013
(Continued)

OTHER PUBLICATIONS

Office Action dated Mar. 16, 2018 relating to South Korean Patent Application No. 10-2017-0055569, 6 pages.
(Continued)

Primary Examiner — Pinel E Romain
(74) Attorney, Agent, or Firm — Stinson LLP

(57) ABSTRACT

A G-sensor for an automobile tray, and more particularly, a G-sensor for an automobile tray wherein a G-sensor for preventing a tray cover from being opened by an external force generated when the vehicle travels is modularized. The G sensor includes a lever configured to rotate around a hinge shaft, a slider coupled to the lever and guided along a key hole according to the state of rotation of the lever, a weight coupled to the lever for endowing a rotational moment of the lever around the hinge shaft, and a spring to provide the lever with power such that the same returns to the original condition.

6 Claims, 5 Drawing Sheets

(52) U.S. Cl.
CPC ... *E05Y 2201/238* (2013.01); *E05Y 2800/252* (2013.01); *E05Y 2800/422* (2013.01); *E05Y 2900/538* (2013.01)

(58) Field of Classification Search
USPC .......................................................... 292/333
See application file for complete search history.

(56) References Cited

U.S. PATENT DOCUMENTS

| | | | |
|---|---|---|---|
| 10,246,908 B2 * | 4/2019 | Ben Abdelaziz | ......... B60R 7/06 |
| 2009/0277906 A1 | 11/2009 | Ahn | |

FOREIGN PATENT DOCUMENTS

| | | |
|---|---|---|
| EP | 2 343 216 B1 | 7/2013 |
| JP | 2010083423 A | 4/2010 |
| KR | 10-0830658 B1 | 5/2008 |
| KR | 100901419 B1 | 6/2009 |
| KR | 10-2011-0063206 A1 | 6/2011 |
| KR | 1020110063206 A | 6/2011 |
| KR | 1020160044831 A1 | 4/2016 |
| KR | 10-1725719 B1 | 4/2017 |

OTHER PUBLICATIONS

Decision to Grant dated Sep. 14, 2018 relating to South Korean Patent Application No. 10-2017-0055569, 3 pages.
Office Action DE 112018002212.9, dated Feb. 14, 2022, 8 pages.

* cited by examiner

G-SENSOR FOR AUTOMOBILE TRAY

CROSS-REFERENCE TO RELATED APPLICATIONS

This application is a national stage application of PCT/KR2018/004771, filed Apr. 25, 2018, which claims priority to Korean application 10-2017-0055569, filed Apr. 28, 2017, the entire contents of which are incorporated herein by reference for all purposes.

TECHNICAL FIELD

The present invention relates to a G-sensor for an automobile tray, and more particularly, to a G-sensor for an automobile tray wherein a G-sensor for preventing a tray cover from being opened by an external force generated when the vehicle travels is modularized such that shared use of components can be realized, and at the same time, the G-sensor can be operably installed on the tray through an easy process.

BACKGROUND

In general, a G-sensor is an element used to prevent a push-type tray from being opened due to an inertial load caused by a collision during front/rear, up/down, and lateral collision of a vehicle.

Conventional G-sensors prevent a tray from being opened by locking the heart cam structure applied to the push-type tray by applying force using a heavy object in the direction opposite to the direction of the force generated when the vehicle collides.

However, in case of a heavy object constituting a G-sensor, its structure is complicated, so it occupies lots of mounting space, causing the tray space to be narrow and the operation mechanism to be complicated.

Hereinafter, various prior art technologies related to G-sensor will be introduced.

Korean Patent No. 10-0645141 (Nov. 3, 2006) discloses "locking device of tray in car."

This is to protect the safety of passengers by preventing a push-type tray mounted on a car from being opened due to inertia.

The locking device of a tray for cars comprises: a tray cover that opens a front surface of a tray, and has one end with a stopper ring; a latch member that is locked by the initial insertion operation of the stopper ring of the tray cover, and unlocked by an additional insertion operation of the stopper ring; and a lock member that gets caught and fixed at a side wall of the stopper ring when inertia is generated only in the opposite direction for inserting the stopper ring to the latch member, so as to prevent the stopper ring from being escaped from the latch member when impact is applied from an external source.

Korean Patent Laid-Open No. 10-2010-0069739 (Jun. 25, 2010) discloses "container apparatus."

The object of this invention is to prevent an unintentional opening of an opening and closing unit due to a malfunction when an external shock occurs due to a vehicle collision by restricting the operation of a holder with a locking unit when the external shock is delivered due to a vehicle collision and the like, and thereby to protect passengers from being hurt by the unintentional protruding of an opening and closing unit due to the malfunction.

The container apparatus comprises: a housing that has an opening; an opening and closing unit that is combined in the housing and opens and closes the opening; a holder that is formed in the opening and closing unit and is operated in communication with the opening and closing unit; and a locking unit that is formed in the housing, and if an external shock is delivered, is circulated from the first location to the second position and restricts the operation of the holder.

Other than the above, Korean Patent Laid-Open No. 10-2002-0055335 (Jul. 8, 2002) discloses a technology relating to an apparatus for locking a console of an automobile, and Japanese Patent Laid-Open No. 2005-349936 (Dec. 22, 2005) discloses a technology relating to a hinge structure of a console.

However, they only disclose a concept that the G-sensor is used, but do not disclose the technical idea that a G-sensor applied to a push-type tray for a vehicle is modularized when an impact occurs such that a shared use of components can be realized for the tray having a different open angle, and at the same time, the G-sensor is modularized to improve assembly in manufacturing vehicles.

SUMMARY

The present invention is designed to solve such conventional problems and is to provide a G-sensor for an automobile tray wherein a G-sensor for preventing a tray cover from being opened by an external force generated when the vehicle travels is modularized such that a shared use of components can be realized for a tray having a different open angle, and at the same time, the G-sensor can be operably installed on a tray through an easy process, so as to improve assembly in manufacturing vehicles.

In order to achieve the aforementioned object, the G-sensor for an automobile tray according to the present invention is accomplished by comprising: a lever (120) configured to rotate in one direction and in the other direction around a hinge shaft (121); a slider (140) guided along a key hole (121a) according to the state of rotation of the lever (120) so as to move upward/downward, thereby controlling the state of opening/closing of a tray cover (210); a weight (130) for endowing a rotational moment such that the lever (120) rotates around the hinge shaft (121), and such that the slider (140) can slide; a housing (110) on which the lever (120) is installed to be able to rotate around the hinge shaft (121), the weight (130) and the slider (140) being coupled to the lever (120); and an elastic body (150), such as a spring, installed to provide the lever (120) installed on the housing (110) with power such that the same returns to the original condition.

On the other hand, please note that the housing (110) is provided with a bumper (160) that prevents friction sound from being generated when a lower portion of the lever (120) to which the weight (130) is coupled is in contact with an inner side of the housing (110) while the lever (120) returns to the original condition after rotating around the hinge shaft (121).

In addition, it is more preferable to install a one-way clutch damper (170) on a lower portion of the lever (120) to which the weight (130) is coupled so as to defer the time when the lever (120) returns to the original condition after rotating around the hinge shaft (121).

On the other hand, the present invention provides a G-sensor for an automobile tray, characterized in that a hook (110a) that is coupled to and released from the tray (200) is formed at one side of the housing (110), and an outwardly protruding engaging projection (110b) that is engaged on the tray (200) is formed at the other side of the housing (110).

According to the present invention, the installation of the G-sensor for preventing a tray cover from being opened by an external force generated when the vehicle travels is completed by installing a housing on a tray, wherein a lever where a weight and a slider are coupled is installed in the housing to be rotatable around a hinge shaft; thus, the invention can produce an effect of reducing a vehicle assembly time.

On the other hand, according to the present invention, the installation of the G-sensor for preventing a tray cover from being opened by an external force generated when the vehicle travels is completed by installing a housing on a tray having a different open angle for each vehicle, wherein a lever where a weight and a slider are coupled is installed in the housing to be rotatable around a hinge shaft; thus, the present invention is very useful, producing an effect of realizing a shared use of components regardless of the type of a vehicle, etc.

DETAILED DESCRIPTION

Hereinafter, the technical constitution of the present invention will be explained in detail with reference to the drawings attached herewith.

Figure 1:
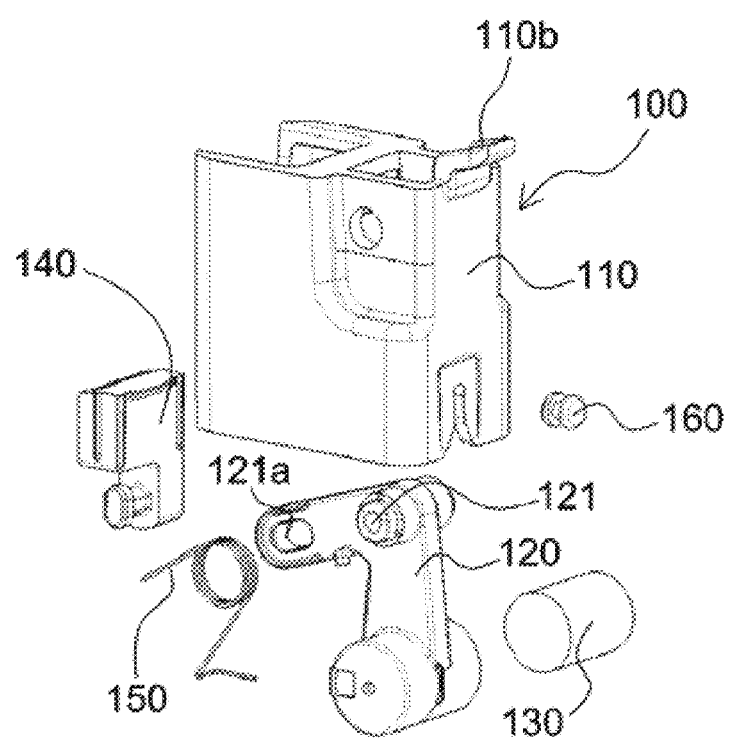
FIG. 1 is an exploded perspective view showing a configuration of a G-sensor for an automobile tray according to the present invention.
Figure 2:
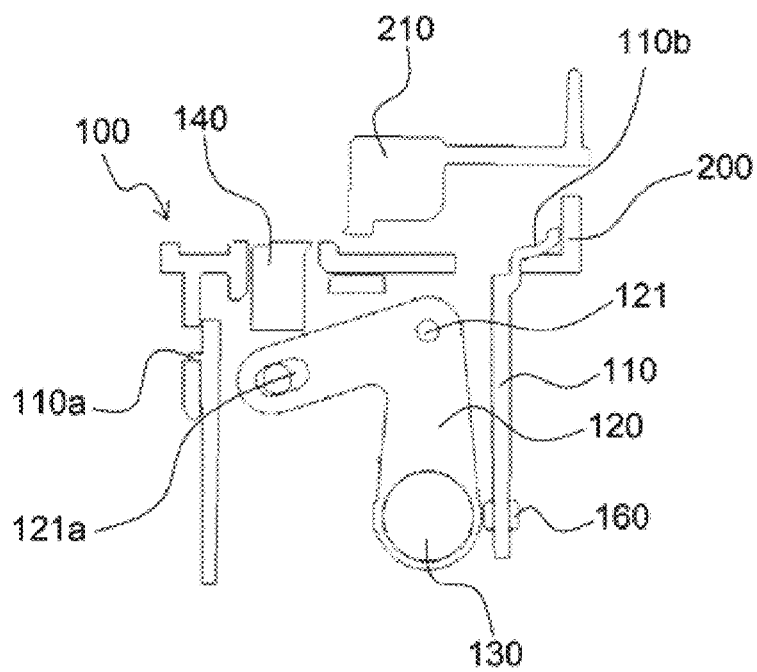
FIG. 2 is a cross section showing an assembly state of a G-sensor for an automobile tray according to the present invention.
Figure 3:
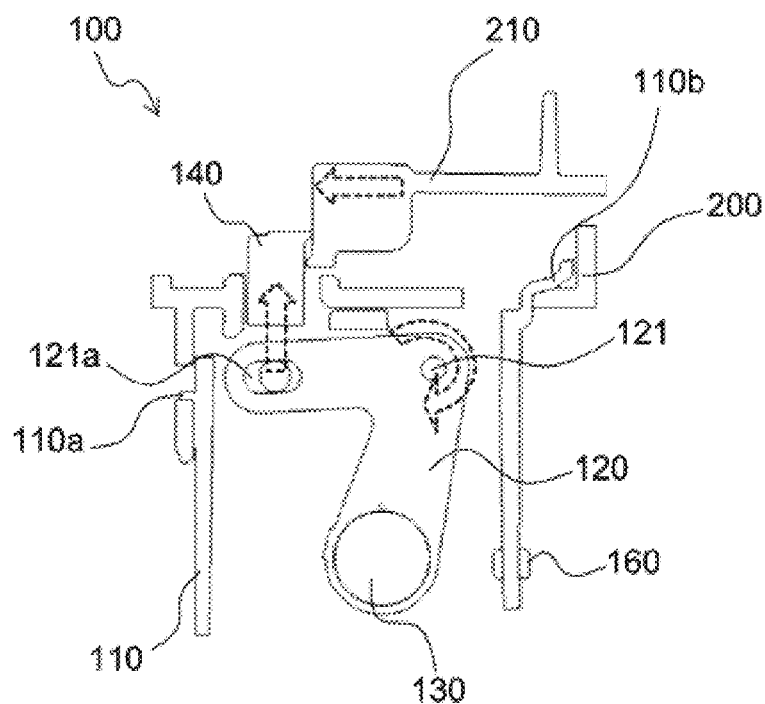
FIG. 3 is a view showing an operation state where a G-sensor for an automobile tray according to the present invention is operated such that the tray cover is not opened.
Figure 4:
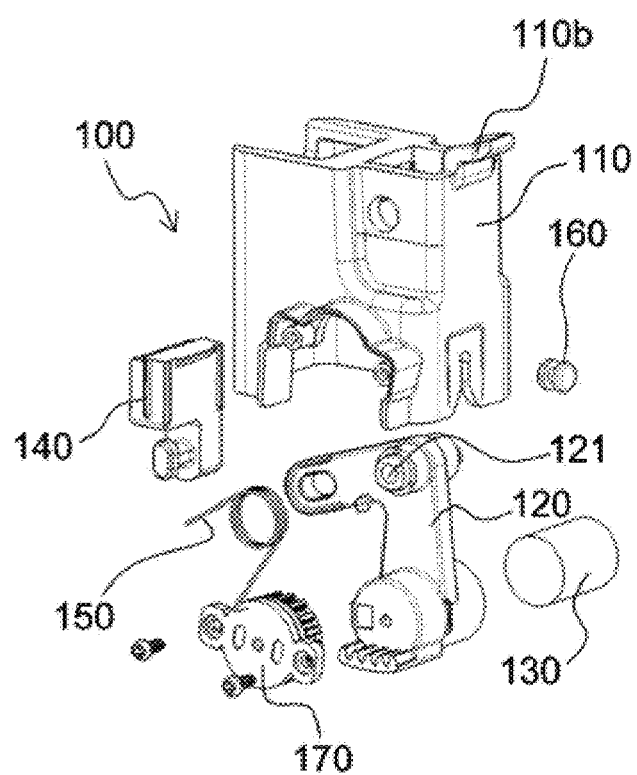
FIG. 4 is an exploded perspective view showing an embodiment of a G-sensor for an automobile tray according to the present invention.
Figure 5:
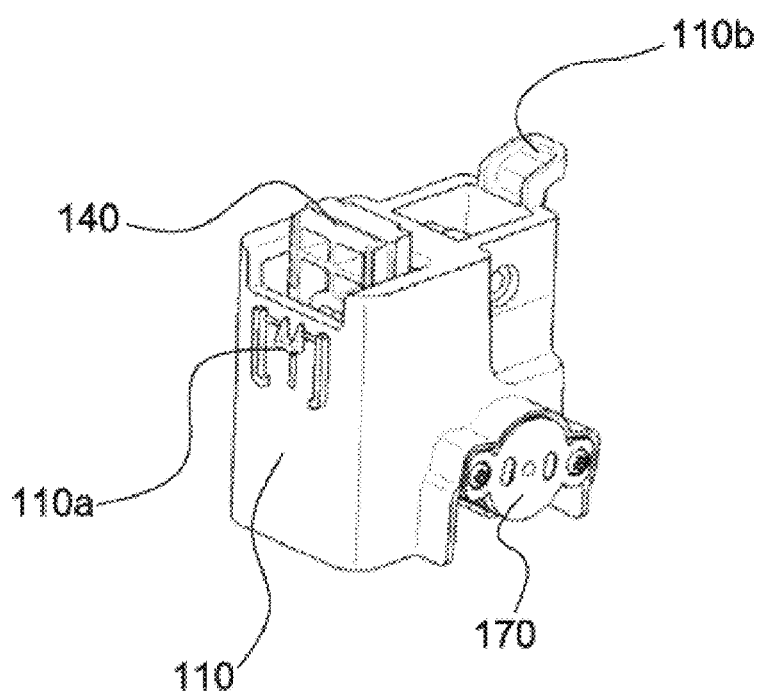
FIG. 5 is a perspective view showing an embodiment of a G-sensor for an automobile tray according to the present invention.

FIG. 1 is an exploded perspective view showing a configuration of a G-sensor for an automobile tray according to the present invention, FIG. 2 is a cross section showing an assembly state of a G-sensor for an automobile tray according to the present invention, FIG. 3 is a view showing an operation state where a G-sensor for an automobile tray according to the present invention is operated such that the tray cover is not opened, FIG. 4 is an exploded perspective view showing an embodiment of a G-sensor for an automobile tray according to the present invention, and FIG. 5 is a perspective view showing an embodiment of a G-sensor for an automobile tray according to the present invention.

As illustrated in FIGS. 1 to 3, the G-sensor for an automobile tray according to the present invention comprises: a lever (120) configured to rotate in one direction and in the other direction around a hinge shaft (121); a slider (140) guided along a key hole (121a) according to the state of rotation of the lever (120) so as to move upward/downward, thereby controlling the state of opening/closing of a tray cover (210); a weight (130) for endowing a rotational moment such that the lever (120) rotates around the hinge shaft (121), and such that the slider (140) can slide; a housing (110) on which the lever (120) is installed to be able to rotate around the hinge shaft (121), the weight (130) and the slider (140) being coupled to the lever (120); and an elastic body (150), such as a spring, installed to provide the lever (120) installed on the housing (110) with power such that the same returns to the original condition.

According to the present invention configured as above, the slider (140) is coupled to be guided along the key hole (121a) formed on the lever (120) so as to move upward/downward, the weight (130) is installed on a lower portion of the lever (120) to which the slider (140) is coupled, and then the lever (120) is installed in the housing (110) to be rotatable around the hinge shaft (121).

After the lever (120) is installed in the housing (110) to be rotatable around the hinge shaft (121), an elastic body (150), such as a spring, is assembled on the lever (120) such that the lever (120) returns to the original condition while rotating around the hinge shaft (121) by its own elasticity force, and fastened to the housing (110).

As described above, the housing (110) is installed at one side of the tray (200), such that as the lever (120) receives a rotation moment from the weight (130) while rotating around the hinge shaft (121) in one direction, the slider (140) is drawn to the outside, and that as the lever (120) rotates around the hinge shaft in the other direction by the elasticity force of the elastic body (150) such as a spring, the slider (140) is drawn to the inside.

Herein, the housing (110) is fixedly installed in a position where the opening of the tray cover (210) can be controlled when the slider (140) is drawn to the outside.

On the other hand, the housing (110) is provided with a bumper (160) that prevents friction sound from being generated when a lower portion of the lever (120) to which the weight (130) is coupled is in contact with an inner side of the housing (110) when the lever (120) returns to the original condition after rotating around the hinge shaft (121) and thereby, no allophone is generated even during a rotation when the lever (120) returns to the original condition by the elastic force of the elastic body (150), such as a spring, after having rotated around the hinge shaft (121) while receiving a rotational moment from the weight (130) by an external impact applied to the tray (200).

In addition, as illustrated in FIG. 4, it is also possible to install a one-way clutch damper (170) on a lower portion of the lever (120) to which the weight (130) is coupled, so as to prevent friction sound from being generated when the lever (120) is in contact with the housing (110) while the lever (120) returns to the original condition by the elasticity force of the elastic body (150) such as a spring after having rotated around the hinge shaft (121).

On the other hand, as illustrated in FIG. 5, a hook (110a) that is coupled to and released from the tray (200) is formed at one side of the housing (110), and an outwardly protruding engaging projection (110b) that is engaged on the tray (200) is formed at the other side of the housing (110), so that the tray (200) is hooked and coupled on the hook (110a) formed at one side of the housing (110), and the engaging projection (110b) protrudingly formed at the other side of the housing (110) is fixed on one side of the tray (200) while being engaged on the tray (200).

Thanks to the above, in manufacturing a vehicle, the housing (110) is fixedly installed at one side of the tray (200), wherein in the housing, the slider (140) is installed to be drawn to the outside and inside by the lever (120) rotating around the hinge shaft (121); then the installation of the G-sensor (100) is completed, thereby reducing an assembly time of the vehicle.

On the other hand, according to the present invention, the installation of the G-sensor (100) for preventing a tray cover (210) from being opened by an external force generated when the vehicle travels is completed by installing the housing (110) on the tray (200) having a different open angle for each vehicle, wherein the lever (120) where the weight (130) and the slider (140) are coupled is installed in the housing to be rotatable around the hinge shaft (121); thus, a shared use of components can be realized, regardless of the type of a vehicle.

It will be apparent to a person having ordinary skill in the art that the present invention explained above is not limited to the aforementioned embodiments and the drawings attached herewith, and various substitutions, modifications and changes can be made within the range that is not beyond the technical idea of the present invention.

EXPLANATION OF REFERENCE NUMERALS

100: G-sensor
110: housing
121: hinge shaft
120: lever
121a: key hole
130: weight
140: slider
150: elastic body
160: bumper
170: one-way clutch damper
200: tray
210: tray cover

The invention claimed is:

1. A G-sensor for an automobile tray comprising:
a lever configured to rotate, from an original condition, in one direction and in another direction around a hinge shaft;
a slider guided along a key hole according to a state of rotation of the lever so as to move upward/downward, thereby controlling a state of opening/closing of a tray cover;
a weight for endowing a rotational moment such that the lever rotates around the hinge shaft and such that the slider can slide;
a housing on which the lever is installed to be able to rotate around the hinge shaft, the weight and the slider being coupled to the lever; and
an elastic body installed to provide the lever installed on the housing with power such that the lever returns to the original condition.

2. The G-sensor for an automobile tray according to claim 1, wherein the housing is provided with a bumper that prevents friction sound from being generated when a lower portion of the lever to which the weight is coupled is in contact with an inner side of the housing while the lever returns to the original condition after rotating around the hinge shaft.

3. The G-sensor for an automobile tray according to claim 1, wherein the housing comprises:
a hook formed at one side of the housing, the hook configured to be coupled to and released from the tray; and
an outwardly protruding engaging projection that is engaged on the tray, the outwardly protruding engaging projection formed at another side of the housing from the hook.

4. A G-sensor for an automobile tray comprising:
a lever configured to rotate, from an original condition, in one direction and in another direction around a hinge shaft;
a slider guided along a key hole according to a state of rotation of the lever so as to move upward/downward, thereby controlling a state of opening/closing of a tray cover;
a weight for endowing a rotational moment such that the lever rotates around the hinge shaft and such that the slider can slide;
a housing on which the lever is installed to be able to rotate around the hinge shaft, the weight and the slider being coupled to the lever;
an elastic body configured to provide the lever installed on the housing with a force of returning the lever to the original condition; and
a one-way clutch damper installed on a lower portion of the lever to which the weight is coupled, so as to prevent friction sound from being generated when the lever is in contact with the housing while the lever returns to the original condition by the elasticity force of the elastic body.

5. The G-sensor for an automobile tray according to claim 4, wherein the housing is provided with a bumper that prevents friction sound from being generated when a lower portion of the lever to which the weight is coupled is in contact with an inner side of the housing while the lever returns to the original condition after rotating around the hinge shaft.

6. The G-sensor for an automobile tray according to claim 4, wherein the housing comprises:
a hook formed at one side of the housing, the hook configured to be coupled to and released from the tray; and
an outwardly protruding engaging projection that is engaged on the tray, the outwardly protruding engaging projection formed at another side of the housing from the hook.

* * * * *